(12) United States Patent
Grant

(10) Patent No.: US 8,227,535 B2
(45) Date of Patent: Jul. 24, 2012

(54) POLYHYDROXY CURABLE FLUOROELASTOMER COMPOSITIONS

(75) Inventor: Christopher Scott Grant, Stow, OH (US)

(73) Assignee: E I du Pont de Nemours and Company, Wilimington, DE (US)

(*) Notice: Subject to any disclaimer, the term of this patent is extended or adjusted under 35 U.S.C. 154(b) by 0 days.

(21) Appl. No.: 13/297,369

(22) Filed: Nov. 16, 2011

(65) Prior Publication Data

US 2012/0142841 A1 Jun. 7, 2012

Related U.S. Application Data

(60) Provisional application No. 61/420,446, filed on Dec. 7, 2010.

(51) Int. Cl.
*C08K 3/10* (2006.01)
*C08L 27/12* (2006.01)
*D06M 15/277* (2006.01)

(52) U.S. Cl. ...................... 524/403; 524/544

(58) Field of Classification Search .................. 524/403, 524/544
See application file for complete search history.

(56) References Cited

U.S. PATENT DOCUMENTS

| | | | |
|---|---|---|---|
| 3,876,654 | A | 4/1975 | Pattison et al. |
| 4,250,278 | A | 2/1981 | Suzuki et al. |
| 4,259,463 | A | 3/1981 | Moggi |
| 4,882,390 | A | 11/1989 | Kolb |
| 4,912,171 | A | 3/1990 | Grootaert |
| 4,957,975 | A | 9/1990 | Carlson et al. |
| 5,591,804 | A | 1/1997 | Coggio et al. |
| 5,648,429 | A | 7/1997 | Chiodini |
| 6,576,701 | B2 * | 6/2003 | Osawa et al. .................. 524/520 |

FOREIGN PATENT DOCUMENTS

CN 101307165 A 11/2008

* cited by examiner

*Primary Examiner* — Mark Eashoo
*Assistant Examiner* — Angela C Scott

(57) ABSTRACT

Disclosed herein is a curable composition comprising a polyhydroxy curable fluoroelastomer, a polyhydroxy curative, a cure accelerator and 11 to 60 parts by weight lanthanum(III) oxide per hundred parts by weight fluoroelastomer. Cured articles made therefrom are resistant to volume swell in acids.

7 Claims, No Drawings

POLYHYDROXY CURABLE FLUOROELASTOMER COMPOSITIONS

CROSS-REFERENCE TO RELATED APPLICATIONS

This application claims the benefit of U.S. Provisional Application No. 61/420,446 filed Dec. 7, 2010.

FIELD OF THE INVENTION

This invention relates to polyhydroxy curable fluoroelastomer compositions comprising i) a fluoroelastomer, ii) a polyhydroxy curative, iii) a cure accelerator and iv) lanthanum(III) oxide.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride ($VF_2$) and units of at least one other copolymerizable fluorine-containing monomer such as hexafluoropropylene (HFP), tetrafluoroethylene (TFE), chlorotrifluoroethylene (CTFE), vinyl fluoride (VF), and a fluorovinyl ether such as a perfluoro(alkyl vinyl ether) (PAVE). Specific examples of PAVE include perfluoro(methyl vinyl ether), perfluoro(ethyl vinyl ether) and perfluoro(propyl vinyl ether).

In order to fully develop physical properties such as tensile strength, elongation, and compression set, elastomers must be cured, i.e. vulcanized or crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Commonly employed curing agents for fluoroelastomers include difunctional nucleophilic reactants such as polyhydroxy compounds.

However, polyhydroxy cured fluoroelastomer articles may exhibit unacceptably high volume swell, e.g. 50-200 vol. %, that can lead to seal failure, when seals are exposed to certain chemicals such as acids for long periods of time or at elevated temperatures.

SUMMARY OF THE INVENTION

In one aspect, the present invention provides a curable fluoroelastomer composition comprising:
A) a polyhydroxy curable fluoroelastomer;
B) a polyhydroxy curative;
C) a cure accelerator; and
D) 11 to 60 parts by weight lanthanum oxide per hundred parts by weight fluoroelastomer.

DETAILED DESCRIPTION OF THE INVENTION

The present invention is directed to polyhydroxy curable fluoroelastomer compositions that, when cured, have reduced volume swell in acids. Such fluororubber articles have surprisingly low volume swell, i.e. less than 10 vol. %, preferably less than 5 vol. %, when exposed to acids for long periods of time and/or at elevated temperatures. The cured fluoroelastomer compositions have a variety of end uses, including chemical transport and dispensing hose and automotive air management system hose and tubing where crank case and exhaust gas recirculation (EGR) vapors produce an acidic environment. The automotive applications include turbocharged air hoses, positive crank case ventilation (PCV) tubing, and EGR sensor hose and tubing Cured fluororubber articles include, but are not limited to seals, gaskets, o-rings, tubing, the acidic vapor or fluid contact layer of multilayer hoses, valve packings and diaphragms.

Fluoroelastomers that are suitable for use in this invention are those that are polyhydroxy curable. By "polyhydroxy curable" is meant fluoroelastomers which are known to crosslink with polyhydroxy curatives such as bisphenol AF. Such fluoroelastomers include those having a plurality of carbon-carbon double bonds along the main elastomer polymer chain and also fluoroelastomers which contain sites that may be readily dehydrofluorinated. The latter fluoroelastomers include, but are not limited to those which contain adjacent copolymerized units of vinylidene fluoride ($VF_2$) and hexafluoropropylene (HFP) as well as fluoroelastomers which contain adjacent copolymerized units of $VF_2$ (or tetrafluoroethylene) and a fluorinated comonomer having an acidic hydrogen atom such as 2-hydropentafluoropropylene; 1-hydropentafluoropropylene; trifluoroethylene; 2,3,3,3-tetrafluoropropene; or 3,3,3-trifluoropropene. Preferred fluoroelastomers include the copolymers of i) vinylidene fluoride with hexafluoropropylene and, optionally, tetrafluoroethylene (TFE); ii) vinylidene fluoride with a perfluoro(alkyl vinyl ether) such as perfluoro(methyl vinyl ether), 2-hydropentafluoropropylene and optionally, tetrafluoroethylene; iii) tetrafluoroethylene with propylene and 3,3,3-trifluoropropene; iv) tetrafluoroethylene, perfluoro(methyl vinyl ether) and hexafluoro-2-(pentafluorophenoxy)-1-(trifluorovinyloxy) propane, and v) ethylene with tetrafluoroethylene, perfluoro(methyl vinyl ether) and 3,3,3-trifluoropropylene.

In addition to the fluoroelastomer, curable compositions of this invention contain a polyhydroxy cure system, meaning a polyhydroxy curative, a vulcanization (or curing) accelerator and a lanthanum(III) oxide compound. The latter acts both as an acid acceptor to facilitate dehydrofluorination of the fluoroelastomer during the crosslinking reaction and as an acid scavenger in order to scavenge any acidic substances such as those produced during the curing reaction or due to exposure of the cured fluoroelastomer article to acidic fluids or vapor.

The curable compositions contain 0.4 to 4 parts by weight (preferably 1 to 2.5 parts) of polyhydroxy curing agent (or a derivative thereof) per 100 parts by weight fluoroelastomer, i.e. 0.4-4 phr (preferably 1-2.5 phr). Typical polyhydroxy cross-linking agents include di-, tri-, and tetrahydroxybenzenes, naphthalenes, and anthracenes, and bisphenols of the formula

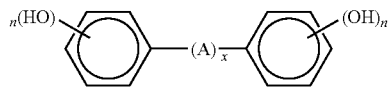

where A is a difunctional aliphatic, cycloaliphatic, or aromatic radical of 1-13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxy-benzene) (i.e. bisphenol AF or BPAF); 4,4"-isopropylidene diphenol (i.e. bisphenol A); 4,4"-dihydroxydiphenyl sulfone; and diamino-bisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

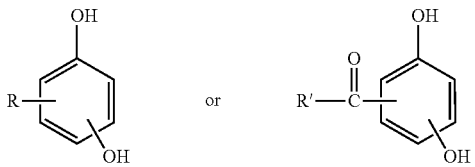

where R is H or an alkyl group having 1-4 carbon atoms or an aryl group containing 6-10 carbon atoms and R' is an alkyl group containing 1-4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$-$R_4$ are $C_1$-$C_8$ alkyl groups and at least three of $R_1$-$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. After filtration, the tetraalkylammonium/BPAF salt may be isolated from solution by evaporation of the methanol. Alternatively, a methanolic solution of tetraalkylammonium hydroxide may be employed in place of the solution of quaternary ammonium salt, thus eliminating the precipitation of an inorganic salt and the need for its removal prior to evaporation of the solution.

In addition, derivatized polyhydroxy compounds such as mono- or diesters, and trimethylsilyl ethers are useful crosslinking agents. Examples of such compositions include, but are not limited to resorcinol monobenzoate, the diacetate of bisphenol AF, the diacetate of sulfonyl diphenol, and the diacetate of hydroquinone.

Vulcanization accelerators (also referred to as cure accelerators) which may be used in the curable fluoroelastomer compositions include tertiary sulfonium salts such as $[(C_6H_5)_2S^+(C_6H_{13})][Cl]^-$, and $[(C_6H_{13})_2S(C_6H_5)]^+[CH_3CO_2]^-$ and quaternary ammonium, phosphonium, arsonium, and stibonium salts of the formula $R_5R_6R_7R_8Y^+ \ X^-$, where Y is phosphorous, nitrogen, arsenic, or antimony; $R_5$, $R_6$, $R_7$, and $R_8$ are individually $C_1$-$C_{20}$ alkyl, aryl, aralkyl, alkenyl, and the chlorine, fluorine, bromine, cyano, —OR, and —COOR substituted analogs thereof, with R being $C_1$-$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltriphenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyl-diphenyl(dimethylamino) phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1, 8-diazabicyclo(5.4.0)-7-undecenonium chloride, diphenylmethyltriphenylphosphonium chloride, allyltriphenyl-phosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.05 and 2 parts by weight per hundred parts by weight fluoroelastomer (0.05-2 phr). Preferably, 0.1 to 1.0 parts accelerator per hundred parts fluoroelastomer is used.

The curable compositions of the invention also contain between 11 and 60 parts by weight (preferably 15 to 40 parts) of lanthanum (III) oxide per 100 parts fluoroelastomer.

Curable compositions of the invention are substantially free from (i.e. contain <100 ppm, preferably less than 10 ppm, most preferably 0 ppm) common inorganic acid acceptors such as divalent metal oxides, divalent metal hydroxides, hydrotalcites, etc. Thus, the curable compositions of the invention are substantially free from calcium hydroxide, magnesium oxide, lead oxide, zinc oxide and calcium oxide.

The fluoroelastomer, polyhydroxy curative, cure accelerator, lanthanum(III) oxide and any other ingredients (e.g. fillers, process aids, colorants, etc.) are generally incorporated into a curable composition by means of an internal mixer or rubber mill. The resulting composition may then be shaped (e.g. molded or extruded) and cured to form a fluororubber article. Curing typically takes place at about 150°-200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded fluororubber article is heated in an oven or the like for an additional period of about 1-48 hours, typically from about 180°-275° C., generally in an air atmosphere.

Another aspect of the present invention is a cured fluoroelastomer article having reduced volume swell in acids wherein the cured article is made from the above-described curable fluoroelastomer compositions. Such fluororubber articles have volume swells less than 10 vol. %, preferably less than 5 vol. %, when exposed to 37% hydrochloric acid at 50° C. for 70 hours, as determined by ASTM D471-96 on standard ASTM D471 coupons.

EXAMPLES

Test Methods

The following physical property parameters were recorded; test methods are in parentheses:
$T_b$: tensile strength, MPa (ASTM D412-92)
$E_b$: elongation at break, % (ASTM D412-92)
M100: modulus at 100% elongation, MPa (ASTM D412-92).
Hardness, Shore A (ASTM D412-92)
Compression Set B (ASTM D395)
Volume Swell (%) after immersion in acid was determined by ASTM D471-96 on standard ASTM D471 coupons. The coupons were prepared from cured fluororubber slabs and immersed in acid in glass tubes fitted with reflux condensers at the temperatures and times noted in the Examples.

The invention is further illustrated by, but is not limited to, the following examples.

Fluoroelastomer (FKM1) employed in the examples was Viton® B651 C, a copolymer of vinylidene fluoride, hexafluoropropylene and tetrafluoroethylene that contains bisphenol AF curative and a quaternary phosphonium salt accelerator, available from DuPont.

Example 1 and Comparative Examples A-D

Curable compositions for Example 1 of the invention and Comparative Examples A-D were made by compounding the ingredients in an internal laboratory mixer and sheet off mill. Formulations are shown in Table I.

The compositions were molded into slabs and pellets (for compression set testing) and press cured at 160° C. for 30 minutes (Comparative Examples A-B) or for 60 minutes (Example 1 and Comparative Example C), followed by post curing in an air oven at 200° C. for 4 hours. Comparative Example D, employing cerium(IV) oxide as the acid acceptor, did not cure, so no further tests were performed.

Coupons made from cured slabs were exposed to either 37% hydrochloric acid for 70 hours at 50° C., or to 70% nitric acid for 70 hours at 70° C.

Example 1 in Table I shows that the lanthanum oxide containing composition exhibits improved resistance to nitric and hydrochloric acids as seen by reduced change in volume as compared to comparative compositions cured using magnesium oxide and calcium hydroxide (Comp. Ex. A), magnesium oxide (Comp. Ex. B), or hydrotalcite (Comp. Ex. C).

TABLE I

| Ingredient, phr[1] | Ex. 1 | Comp. Ex. A | Comp. Ex. B | Comp. Ex. C | Comp. Ex. D |
|---|---|---|---|---|---|
| FKM1 | 100 | 100 | 100 | 100 | 100 |
| Ca(OH)$_2$ | 0 | 6 | 0 | 0 | 0 |
| MgO[2] | 0 | 3 | 0 | 0 | 0 |
| MgO[3] | 0 | 0 | 15 | 0 | 0 |
| Lanthanum (III) oxide | 15 | 0 | 0 | 0 | 0 |

TABLE I-continued

| Ingredient, phr[1] | Ex. 1 | Comp. Ex. A | Comp. Ex. B | Comp. Ex. C | Comp. Ex. D |
|---|---|---|---|---|---|
| Hydrotalcite[4] | 0 | 0 | 0 | 15 | 0 |
| Cerium (IV) oxide | 0 | 0 | 0 | 0 | 15 |
| Carbon black N990 | 30 | 30 | 30 | 30 | 30 |
| Physical Properties | | | | | |
| M100, MPa | 3.2 | 3.7 | 4.6 | 6.2 | — |
| Tb, MPa | 9.3 | 12.5 | 11.0 | 13.4 | — |
| Eb, % | 353 | 335 | 351 | 263 | — |
| Hardness, A, pt. | 73 | 71 | 75 | 86 | — |
| Compression Set | | | | | |
| 70 hours, 200° C., % | 26 | 43 | 36 | 67 | — |
| % Volume swell in 37% HCl | 7 | 16 | 25 | 19 | — |
| Volume swell in 70% HNO$_3$ | 23 | 54 | 85 | 47 | — |

[1]parts by weight per hundred parts rubber (i.e. fluoroelastomer)
[2]Elastomag 170 (available from Akrochem Corporation)
[3]Maglite Y (available from The HallStar Company)
[4]DHT-4A (available from Kyowa Chemical Industry Co. Ltd.)

What is claimed is:

1. A curable fluoroelastomer composition comprising:
   A) a polyhydroxy curable fluoroelastomer;
   B) a polyhydroxy curative;
   C) a cure accelerator; and
   D) 11 to 60 parts by weight lanthanum oxide per hundred parts by weight fluoroelastomer.

2. The curable fluoroelastomer composition of claim 1 wherein said lanthanum oxide is present in an amount of 15 to 40 parts by weight per hundred parts by weight fluoroelastomer.

3. The curable fluoroelastomer composition of claim 1 wherein said fluoroelastomer is selected from the group consisting of copolymerized units of i) vinylidene fluoride with hexafluoropropylene; ii) vinylidene fluoride with hexafluoropropylene and tetrafluoroethylene; iii) vinylidene fluoride with perfluoro(methyl vinyl ether), and 2-hydropentafluoropropylene; iv) vinylidene fluoride with perfluoro(methyl vinyl ether), 2-hydropentafluoropropylene and tetrafluoroethylene; v) tetrafluoroethylene with propylene and 3,3,3-trifluoropropene; vi) tetrafluoroethylene, perfluoro(methyl vinyl ether) and hexafluoro-2-(pentafluorophenoxy)-1-(trifluorovinyloxy) propane; and vii) ethylene with tetrafluoroethylene, perfluoro(methyl vinyl ether) and 3,3,3-trifluoropropylene.

4. The curable fluoroelastomer composition of claim 1 wherein said polyhydroxy curing agent is selected from the group consisting of i) dihydroxy-, trihydroxy-, and tetrahydroxy-benzenes, -naphthalenes, and -anthracenes;
ii) bisphenols of the formula

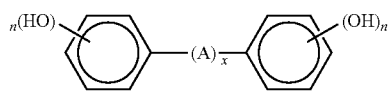

where A is a stable divalent radical; x is 0 or 1; and n is 1 or 2;

iii) dialkali salts of said bisphenols, iv) quaternary ammonium and phosphonium salts of said bisphenols, v) tertiary sulfonium salts of said bisphenols, and vi) esters of phenols.

5. The curable fluoroelastomer composition of claim 1 wherein said cure accelerator is selected from the group consisting of quaternary ammonium salts, tertiary sulfonium salts and quaternary phosphonium salts.

6. A cured fluoroelastomer article obtained from the composition of claim 1.

7. The cured fluoroelastomer article of claim 6 having a volume swell less than 10 vol. % after exposure to 37% hydrochloric acid at 50° C. for 70 hours as determined by ASTM D471-96.

* * * * *